United States Patent [19]

Ueno et al.

[11] Patent Number: 5,496,118
[45] Date of Patent: Mar. 5, 1996

[54] TAPE PRINTING DEVICE

[75] Inventors: Hideo Ueno, Nagoya; Minako Ishida, Ama; Sachiyo Nagase, Nishikasugai, all of Japan

[73] Assignee: Brother Kogyo Kabushiki Kaisha, Nagoya, Japan

[21] Appl. No.: 369,311

[22] Filed: Jan. 5, 1995

Related U.S. Application Data

[63] Continuation of Ser. No. 28,197, Mar. 9, 1993, abandoned.

[30] Foreign Application Priority Data

Apr. 30, 1992 [JP] Japan .................................. 4-139929

[51] Int. Cl.⁶ ............................................... B41J 5/30
[52] U.S. Cl. .............................. 400/61; 400/63; 400/76; 400/586
[58] Field of Search ................................ 400/120, 208, 400/586, 708, 61, 62, 63, 76, 279, 582, 615.2; 395/105, 110, 109, 117

[56] References Cited

U.S. PATENT DOCUMENTS

| | | | |
|---|---|---|---|
| 4,395,144 | 7/1983 | Adams et al. | 101/35 |
| 4,799,172 | 1/1989 | Wood et al. | 400/76 |
| 5,066,152 | 11/1991 | Kuzuya et al. | |
| 5,168,814 | 12/1992 | Kuzuya et al. | 400/120 |
| 5,253,334 | 10/1993 | Kimura et al. | 400/586 |
| 5,263,132 | 11/1993 | Parker et al. | 395/146 |

FOREIGN PATENT DOCUMENTS

| | | |
|---|---|---|
| 1-152070 | 6/1989 | Japan . |
| 2-106555 | 4/1990 | Japan . |

*Primary Examiner*—John S. Hilten
*Attorney, Agent, or Firm*—Oliff & Berridge

[57] ABSTRACT

In a tape printing device, pressing the print execution key when print data and size data are stored on the memory causes the tape printing device to perform a calculation to obtain the total character height based on the number of print lines L and the vertical size of the print image. The tape printing device further performs a calculation to obtain the total blank space width based on the total height and the print allowance area and distributes the total width into the upper blank space width, the lower blank space width and the blank space width between the print lines based on the result of the calculation. The blank spaces are positioned according to the blank widths. The dot pattern data is spread along the base lines and positioned in the process.

21 Claims, 10 Drawing Sheets

TAPE PRINTING DEVICE

This is a continuation of application Ser. No. 08/028,197 filed Mar. 9, 1993, now abandoned.

BACKGROUND OF THE INVENTION

1. Field of the Invention

The present invention relates to a tape printing device for printing characters on a tape print medium, and, more particularly, to a tape printing device with a function to allocate a plurality of print lines across the width of the tape medium, so that the print lines are neatly arranged on the tape print medium.

2. Description of Related Art

The applicants of the present invention have developed a tape printing device for printing characters and marks on the tape print medium (e.g. a tape medium with a width of 10 mm, 24 mm) as disclosed in U.S. Pat. No. 5,066,152. The tape printing device has a convenient application in printing tape labels to be secured on the back of file notes.

In addition to the above disclosure, in Japanese Laid-Open patent publication No. HEI 1-152070, the applicants have disclosed a tape printing device with a function to print full scale characters in a 24 dot by 24 dot format and quadruple scale characters in a 48 dot by 48 dot format, a center printing mode to arrange the quadruple scale characters in the center of the tape medium and a bottom alignment mode to align the bottoms of quadruple scale characters on the tape medium.

Conventional tape printing devices perform dual line printing by aligning bottoms of the characters and marks to the base alignment set on the bottom of the print allowance area and by aligning tops of characters or marks to the top alignment set on the top of the print allowance area.

In the above construction, the width of the blank space between the two lines changes according to the sizes of the characters, bringing an unbalanced space between the middle blank space and a top blank space and the middle blank space and a bottom blank space, thus degrading the visual impression of the printed tape medium.

SUMMARY OF THE INVENTION

An object of the present invention is to provide a tape printing device with a function to arrange multiple lines on tape print medium so that the top blank space, bottom blank space and blank spaces between the printed lines represent a well-balanced impression.

In a tape printing device having a printing means including a printing head with a plurality of dot-like elements for printing on a tape medium, an input means for inputting characters, marks and various instructions, a data storage means for storing data for said characters and marks and a print control means for receiving said data sent from said data storage means and combining said data to form a dot pattern data to be sent to the printing means for print execution, said tape printing device comprises; a size setting means for setting sizes of characters and marks corresponding to an individual printing line, a blank space width calculation means for calculating the width of blank spaces so that the blank spaces between a plurality of printing lines and the blank spaces above and under the print allowance area have an identical width, wherein said print control means receives information on the width of the blank spaces from said blank space width calculation means for forming the dot pattern data.

In a tape printing device, the data storage means stores data for characters and marks input from the input means, the print control means combines data read out from the character generator to generate dot pattern data based on the data sent from the data storage means, and the dot pattern data is fed to the printing means for print execution.

The size setting means sets the sizes of characters and marks corresponding to each line, and the blank space width calculation means calculates the width of the blank spaces between the printing lines so that the blank spaces have an identical width as that of the top blank space and the bottom blank space. The print control means receives the data on the blank space width from the blank space width calculation means and generates dot pattern data including the blank spaces with the calculated width. The printing means executes printing based on the dot pattern data generated by the print control means.

As is apparent from above description, in the tape printing device, the size setting means sets the sizes of the characters and marks on a plurality of print lines, and the blank space calculation means calculates the width of the blank spaces on both ends across the width of the tape medium and between the print lines. This function allows the tape printing device to perform printing on the tape medium with the total blank space width distributed into the blank spaces irrespective of the difference in the character sizes, thus giving the printed medium a neat impression.

DETAILED DESCRIPTION OF PREFERRED EMBODIMENTS

Hereinafter, a preferred embodiment of the present invention is described with reference to the accompanying figures.

As used herein, the term "width", particularly with reference to the blank space width, means the distance from side to side of the blank space. For example, the width of the blank space between lines means the distance from the top of the characters in a lower line to the bottom of the characters in an upper line.

The present embodiment is an application of the present invention to a tape printing device for printing alphabetic characters and marks.

Figure 1:
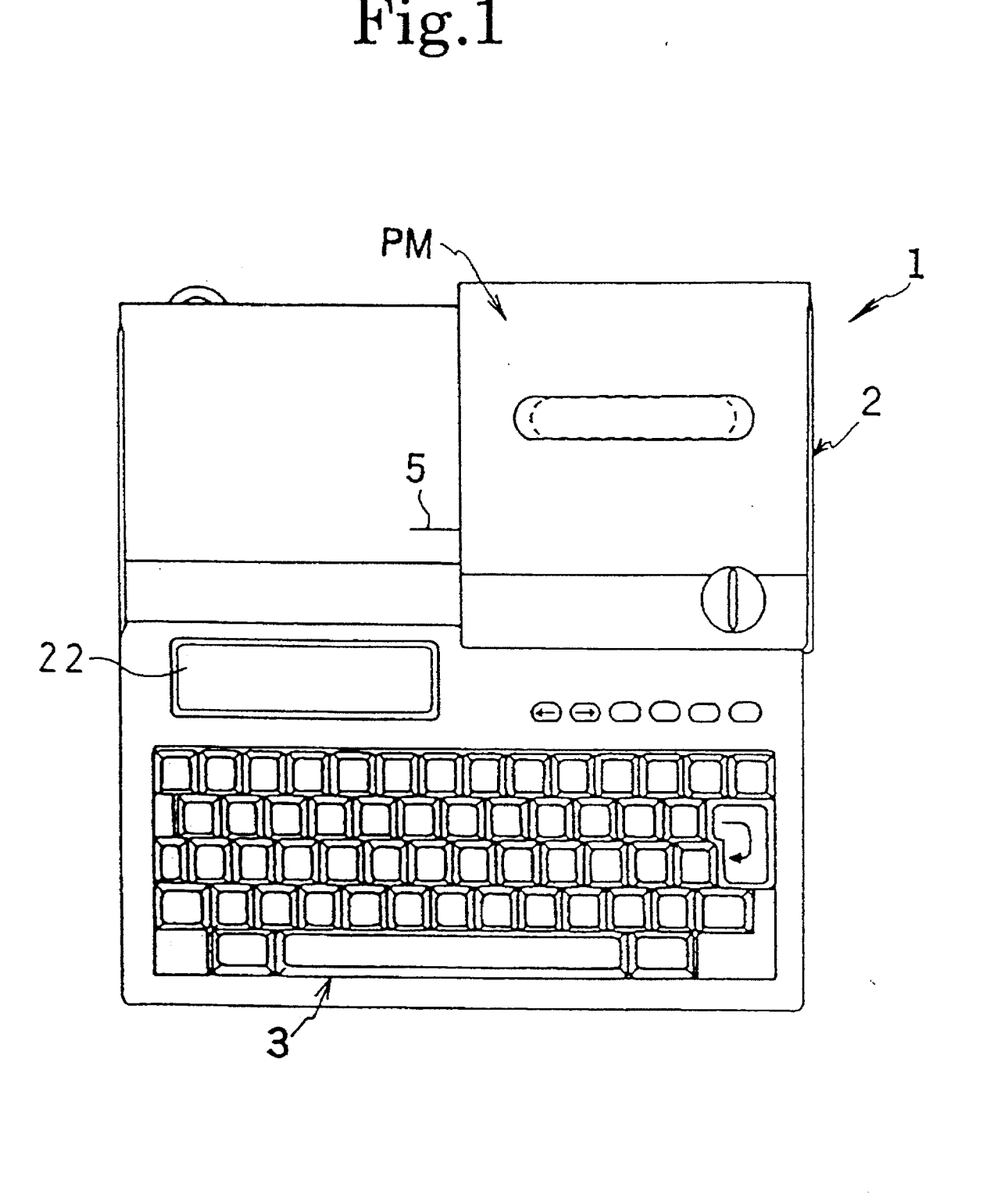
FIG. 1 is a plan view of the tape printing device in accordance with the present invention.

As shown in FIG. 1, the tape printing device 1 has a keyboard 3 in the front of the main frame 2. A print mechanism PM is provided behind the keyboard 3 inside the main frame 2, and a liquid crystal display 22 is provided behind the keyboard 3 for displaying characters and marks.

The keyboard 3 has character keys for inputting alphabetic characters, numeric characters and marks, a space key, a carriage return key, cursor keys to locate the cursor, a composition key for editing text data, a format setting key for setting print format, a size setting keys for setting sizes of characters, a font setting key for setting character fonts, a print key for initiating print execution and a power key for controlling power supply to the tape printing device.

Figure 2:
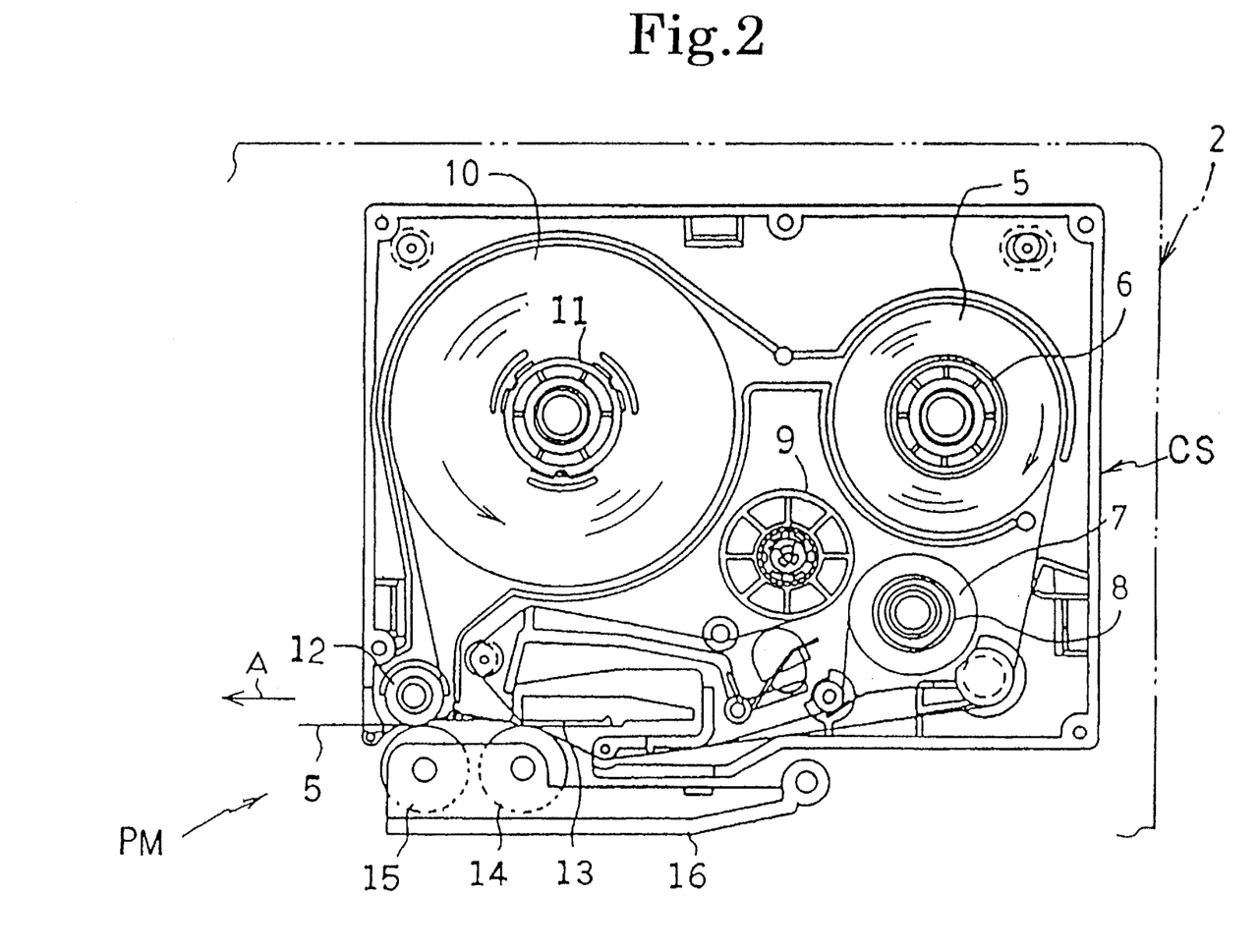
FIG. 2 is a schematic plan view of the print mechanism of the tape printing device of FIG. 1.

A brief description of the print mechanism PM is given with reference to FIG. 2. The print mechanism PM accommodates a tape cassette CS generally in the shape of a rectangular block. The tape cassette CS has a tape spool 6 to which a transparent tape medium 5, preferably with a width of about 24 mm, is wound, a ribbon supply spool 8 to which an ink ribbon 7 is wound, a take up spool 9 for taking up the ink ribbon 7, a supply spool 11 to which a double-sided adhesive tape 10 with an identical tape width as the tape medium 5 is wound with a releasable sheet facing outside of the spool and a contact roller 12 for contacting the tape medium 5 with the double-sided adhesive tape 10.

Figure 9:
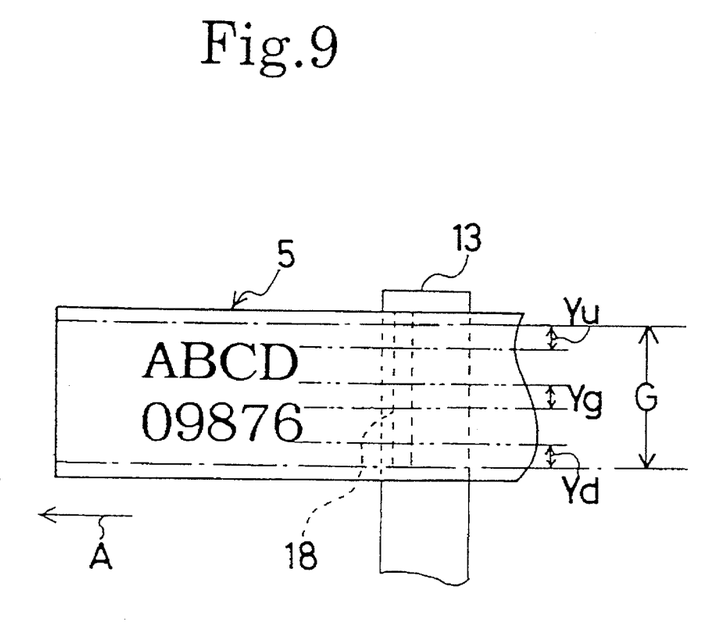
FIG. 9 is a sample illustration of the printed image on the tape medium.
Figure 11:
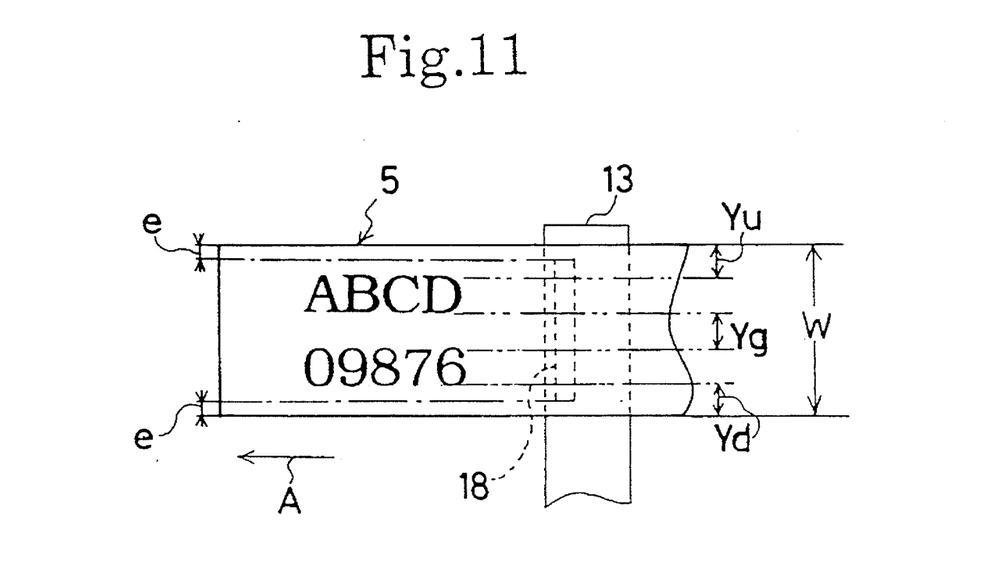
FIG. 11 is a another sample illustration of the printed image on the tape medium.

A thermal head 13 is provided upright at a position where the tape medium 5 and the ink ribbon 7 overlap. A platen roller 14 for urging the tape medium 5 and the ink ribbon 7 against the thermal head 13 and a sending roller 15 for urging the tape medium 5 and the double-sided adhesive tape 10 against the contact roller 12 are rotatably provided at the supporting member 16. The thermal head 13 has a thermal element group 18, as shown in FIGS. 9 and 11, provided in a perpendicular line. The thermal element group 18 preferably extends about 20 mm in length, shorter than the width of the tape medium 5 of 24 mm, thus limiting the print allowance area G on the tape medium 5. Consequently, the print inhibit areas e are evenly allocated on the top and bottom of the tape medium as shown in FIG. 11.

With the above construction, applying power to the thermal devices with the tape sending motor 24 (shown in FIG. 3) driving the contact roller 12 and the take up spool 9 in synchronism to a prescribed direction causes the print execution on the tape medium 5 by a plurality of dots. The tape medium 5 is sent in the tape sending direction A with the double-sided adhesive tape 10. The print mechanism PM is described in detail in Japanese Laid-Open Patent Publication No. HEI 2-106555.

Figure 3:
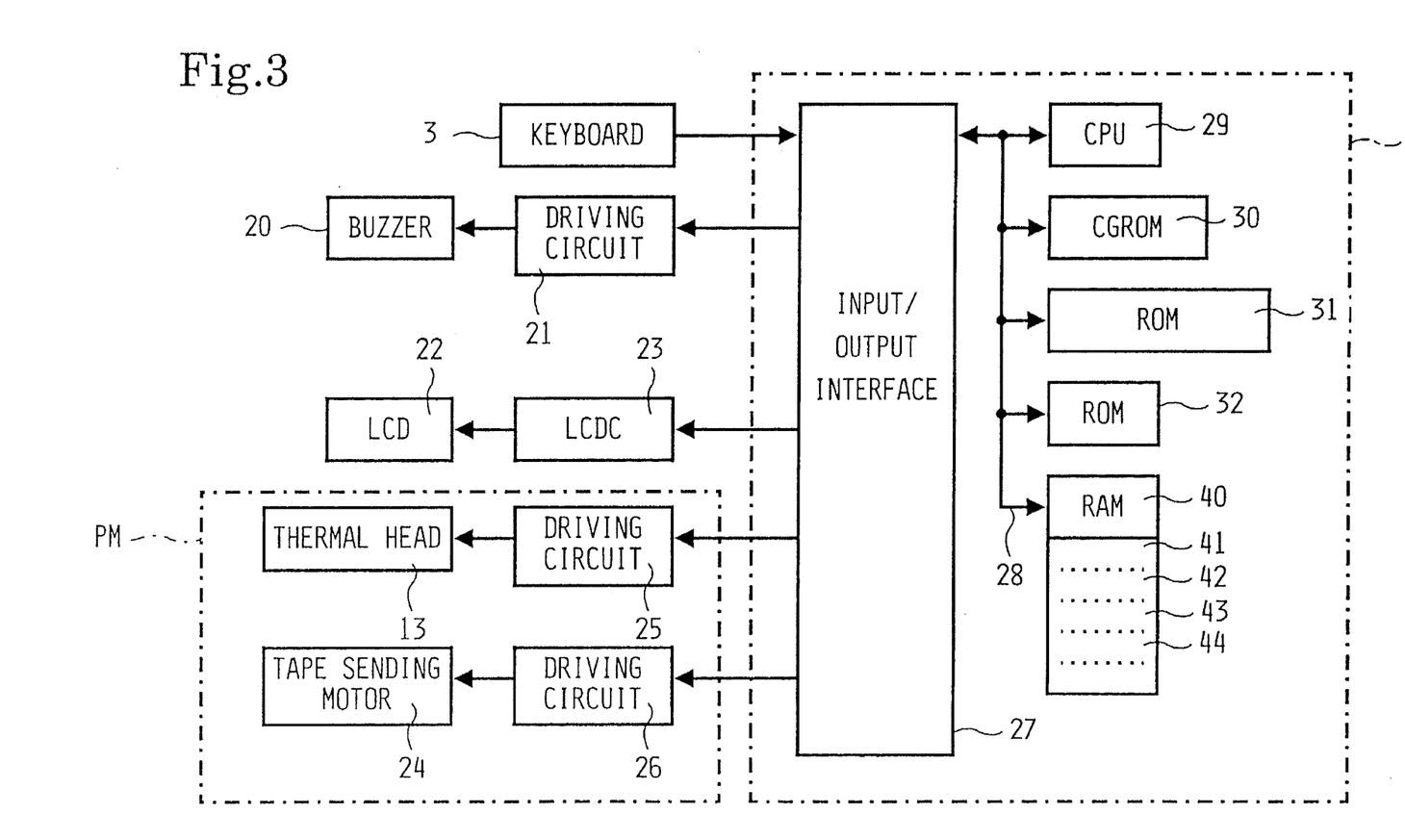
FIG. 3 is a block diagram depicting the control system of the tape printing device.

The control scheme of the tape printing device 1 is described with reference to the block diagram in FIG. 3.

A keyboard 3, a display controller (LCDC) 23 with a display RAM for storing display data for the liquid crystal display (LCD) 22, and a driving circuit 25 for driving the thermal head 13, a driving circuit 26 for driving the tape sending motor 24 and a driving circuit 21 for driving a warning buzzer 20 are connected to the input/output interface 27 respectively.

The controller C has a CPU 29, an input/output interface 27 which is connected to the CPU 29 via a bus 28, a CGROM 30, a ROM 31, a ROM 32 and a RAM 40.

The CGROM 30 (pattern data memory) holds dot pattern data for each one of a plurality of characters, and the data stored on the CGROM 30 corresponds to a code data for each character. The ROM 31 (outline data memory) holds outline data on the contouring of each character classified in different fonts (Gothic fonts, Mincho-KANJI fonts) corresponding to code data. Each outline data representing one character holds a horizontal size and a vertical size of the printed image of the character.

The ROM 32 stores a drive control program for controlling the display controller 23 based on the character codes for the characters, numeric characters and marks input from the keyboard, an image process program for converting outline data into dot pattern data and overlaying the dot pattern data on the print buffer 44, a print drive control program for retrieving the dot pattern data on the print buffer 44 and driving the thermal head 13 and the tape sending motor 24, and a control program unique to the present invention for controlling the tape print control (described later). The ROM 32 also stores a width of the print allowance area and a width of the print inhibit area. The image process program includes such character modification subroutines for modifying characters in bold font, underline and reversed printing.

Figure 7:
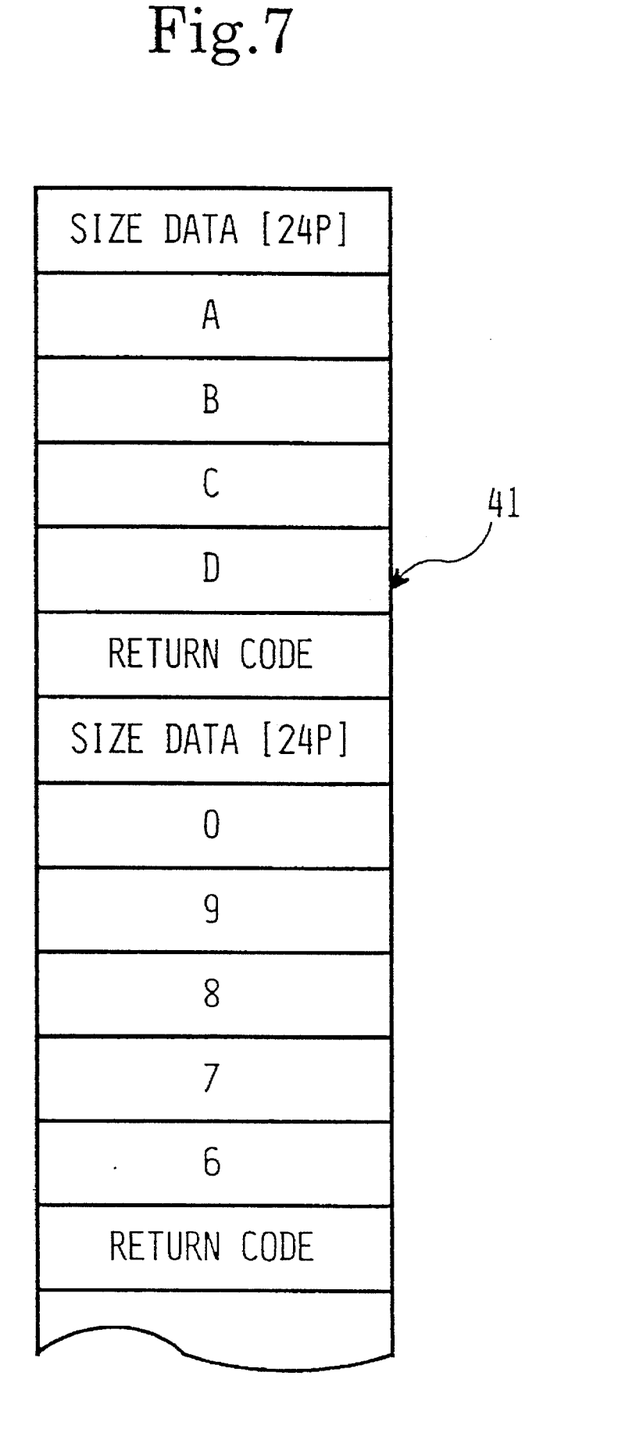
FIG. 7 is a chart schematically illustrating the data structure in the text memory.

The text memory 41 in the RAM 40 stores code data for characters and marks input from the keyboard 3. The print format memory 42 holds print format data including character size data PZ and font data input by an operator. The print line number memory 43 stores number of lines L to be printed on the tape medium 5. The print buffer 44 stores dot pattern for a plurality of characters and marks decoded from the code data. The print buffer 44 has a memory capacity to store vertical 128 bits (16 bytes) corresponding to 128 dots by horizontal width corresponding to 50 characters. The dot pattern data for one line or a plurality of lines are decoded from the code data along the base line (BL) (described later).

Figure 4:
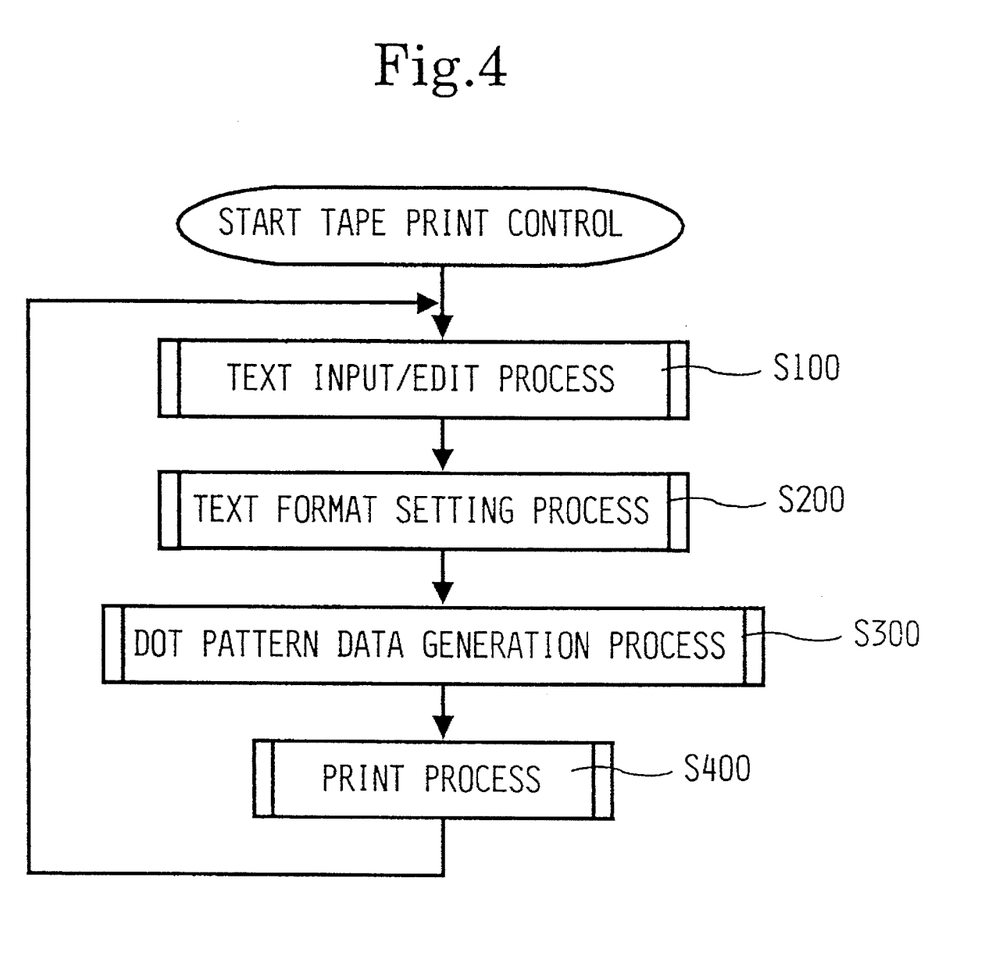
FIG. 4 is a flow chart depicting the control software for the print execution.

The tape print control routine executed by the controller C of the tape printing device is now described with reference to the flowchart in FIG. 4. The sign Si (i=10, 11, 12 . . . ) represents each step in the routine.

Operating a power switch and applying power to the tape printing device initiate the subroutine, and pressing the composition key allows an operator to edit the text by typing keys such as a character key, the space key and the carriage return key (S100). In this input/edit process, the operator can set specific modifications to parts of text by operating, for example, the size key or the font setting key so that printed images reflect the modifications.

After the above operation, operating the format setting key initiates the format setting routine for setting character sizes and character modifications (S200). The format setting routine is followed by the dot pattern data generation process (S300) and the dot pattern data on the print buffer is sent to the print mechanism for print execution.

Figure 5:
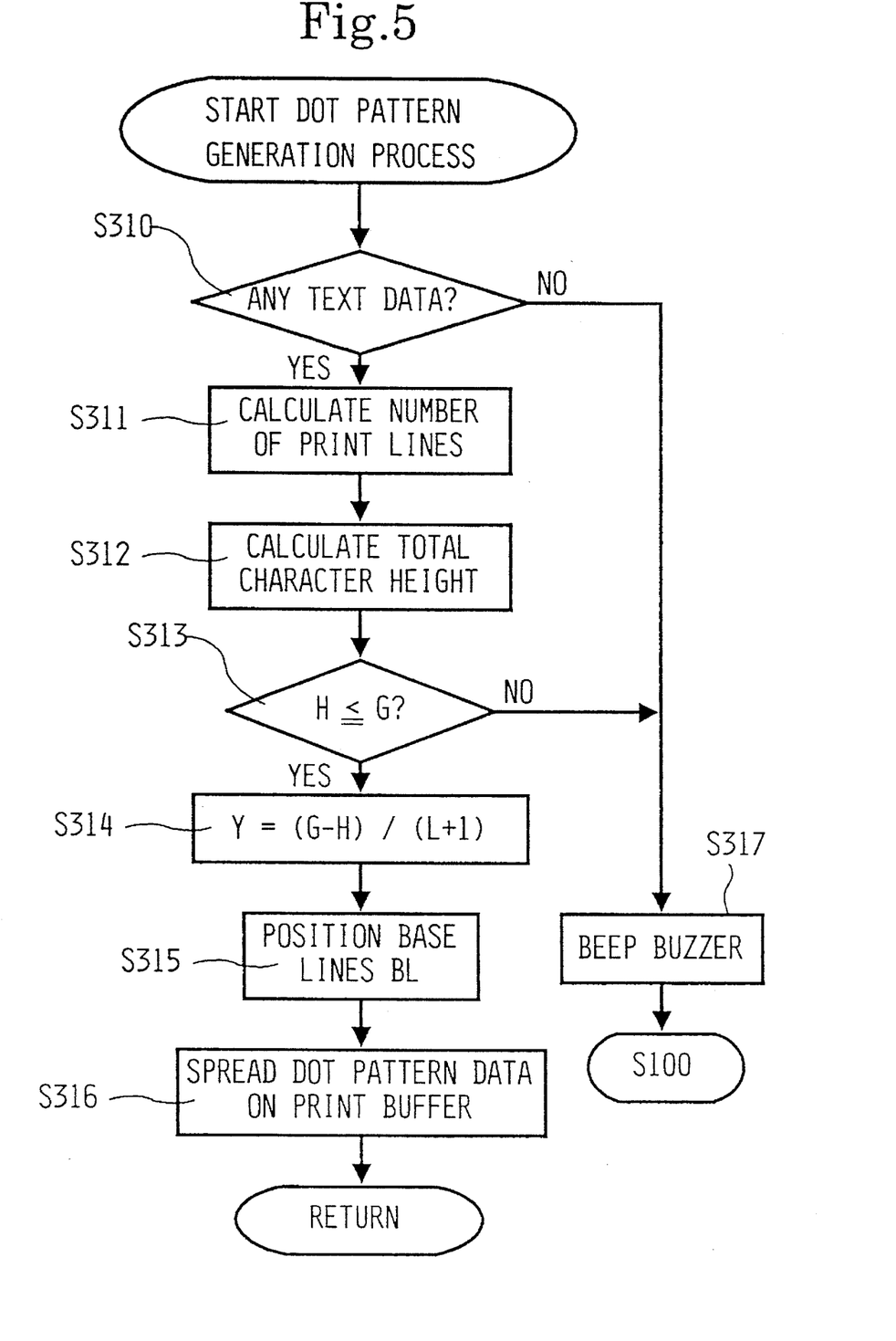
FIG. 5 is a flow chart depicting the control software for the dot pattern data generation.

Now, the dot pattern data generation process executed in S300 is described according to the flowchart in FIG. 5. In this description, it is assumed that two strings of characters "ABCDE" and "09876" are loaded to the text RAM 41 so that two lines of characters are printed on the tape medium. Each line of characters is preceded by size data.

Figure 8:
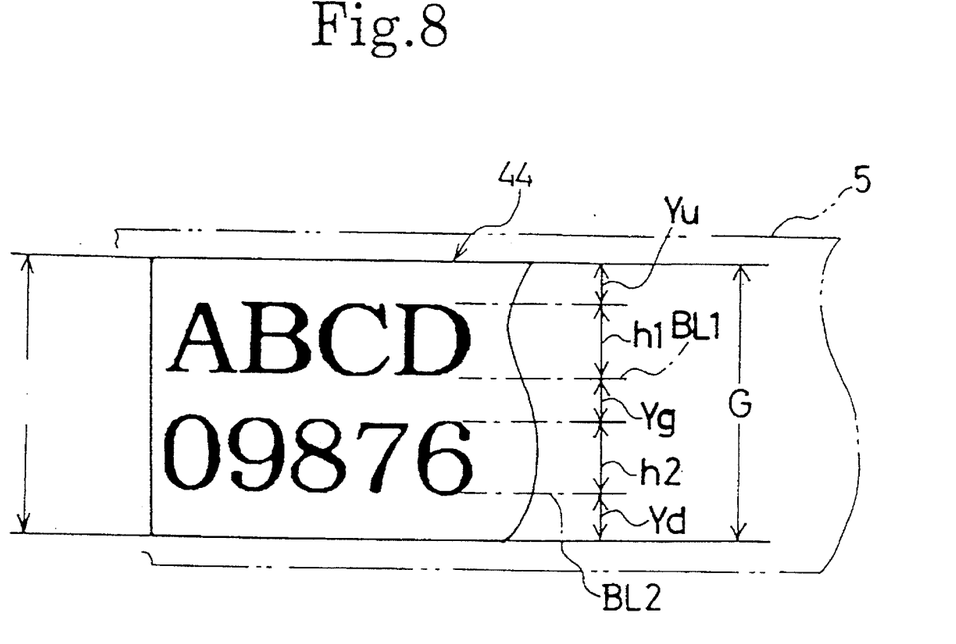
FIG. 8 is a sample illustration of the allocation of the character image spread on the print buffer.

After the initiation of the dot pattern generation process, if text data exists on the text memory 41 (S310:YES), the controller C calculates the number of lines L and stores it on the print line number memory 43 (S311). The controller C further performs a calculation to obtain a total height of characters H from the number of lines L and a height of printed image of characters (S312). For example, as shown in FIG. 8, the total height H is calculated from the number of lines, in this example, two, and the size data, in this example, 24P, by totaling the height h1 for the first line and h2 for the second line.

In the next step (S313), if the total height of characters H is smaller than or equal to the width of print allowance area G, the blank space width Y is calculated in the following expression.

$$Y=(G-H)/(L+1)$$

The upper end blank space width Yu, the lower end blank space width Yd and the blank space width between the lines Yg is set at Y respectively (S314). In the next step (S315), base lines BL for the print lines are allocated based on the blank widths Yu, Yd, Yg, the print allowance area G, and character heights h1, h2, . . . corresponding to print lines. For example, as shown in FIG. 8, the vertical bit-width of the print image stored on the print buffer 44 is identical to the number of thermal elements provided on the thermal element group 18, allowing the tape printing device to perform dual line printing by setting the BL2 corresponding to the second print line with a margin of the lower end blank space width Yd above the lower end of the tape medium, the BL2 corresponding to the first print line with a margin given by totaling the character height h2 for the second print line and the blank space width between the lines Yg above the BL2.

The controller C retrieves the character code data from the text memory 41 and performs the image enlarge/condense process to combine the outline data to generate image data. The locations of base lines BL calculated in the above step are used in the image generation process (S316). After the image generation process, the controller C resumes the tape print control (FIG. 4) for print execution according to the dot pattern data stored on the print buffer 44 (S400). Prior to the print execution, the controller C examines the text memory 41, and if the text data does not exist on the text memory 41 (S310:No) or if the total character height H is larger than the width of the print allowance area G (S313:No), the controller C beeps the buzzer 20 (S317), notifying an operator that the print execution is impossible, and performs the operation in S100. For example, as shown in FIG. 8, the dot pattern data for the character string "ABCDE" corresponding to single print line is spread on the memory along the base line BL1, and the dot pattern data for the character string "09876" is spread along the base line BL2. As shown in FIG. 9, the blank spaces Yu and Yg over and under the print allowance area G and the blank space width between the lines Yg are well-balanced even if the characters have different heights.

Figure 6:
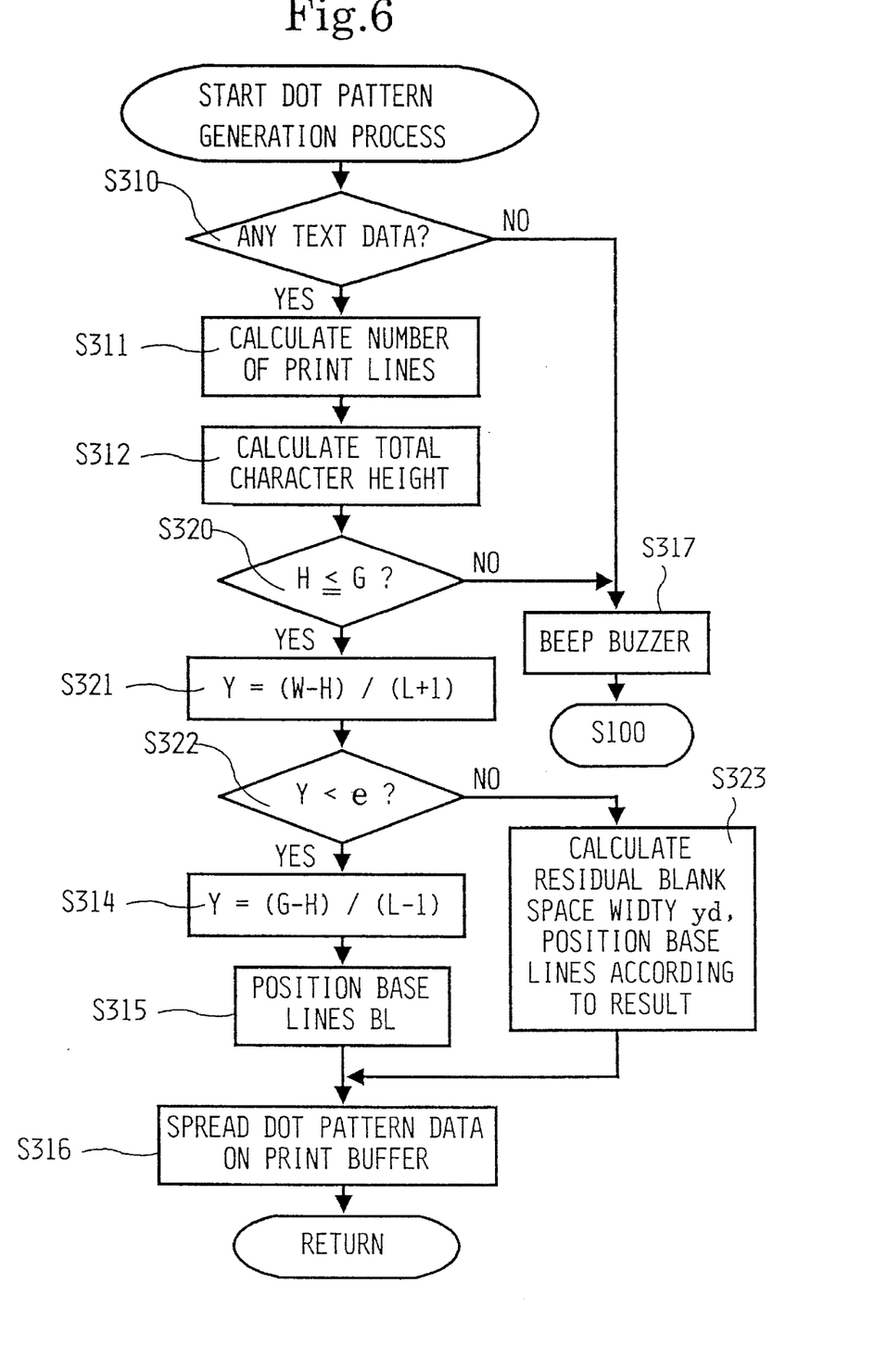
FIG. 6 is a flow chart depicting the control software for the dot pattern data generation with a modification made to the software depicted in FIG. 6.
Figure 12:
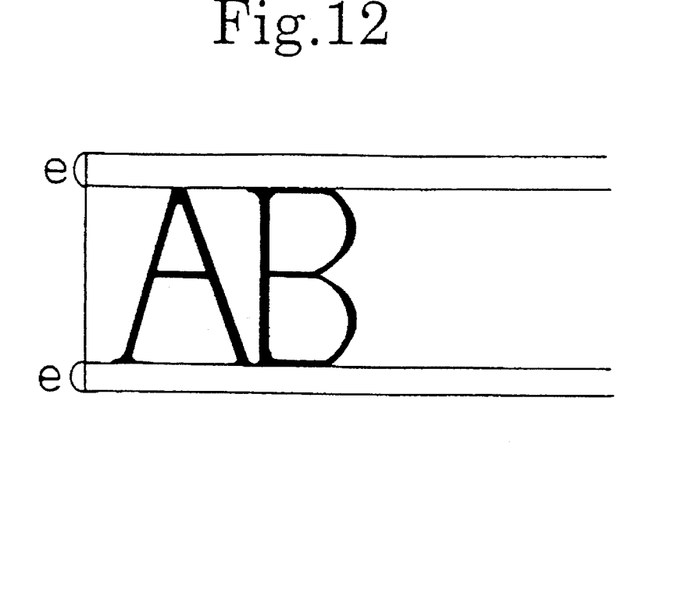
FIG. 12 is a sample illustration of a printed image of single print line on the tape medium.

Besides the above function, as shown in FIG. 6, a partial modification can be made in the above dot pattern data generation process by replacing S313 with S320 through S322. The modification enables the tape printing device to perform multiple line printing with the total blank space evenly distributed to Yu, Yd and Yg. In other words, after calculating the number of print lines L and total character height H (S311,S312), if the total character height H is smaller than or equal to the width of the print allowance area G (S320:Yes), the blank width Y is calculated in the expression Y=(W−H)/(L+1), and the blank space widths Yu, Yd and Yg are set at Y respectively (S321). In the calculation, if L is found to be 1, Yu and Yd are set at e respectively so that the characters are printed across the entire width of the print allowance area G (S322:No). FIG. 12 shows the printed medium with single print line.

The size data on the tape width W is stored on the ROM 32 and referred to in the calculation. In the next step, if the blank space width Y is larger than the width of the print inhibit area e and print execution is possible (S322:No), the residual lower blank space width Yd is calculated by subtracting the width of the print inhibit area e from the lower end blank space width Yd, the base lines BL are positioned according to the residual lower blank space width Yd, the upper blank space width Yu, the blank space width between the print lines Yg, and the tape width and the character heights h1, h2, . . . (S323). The positioning process is followed by the image generation process illustrated above and subsequent print execution (S400).

Figure 10:
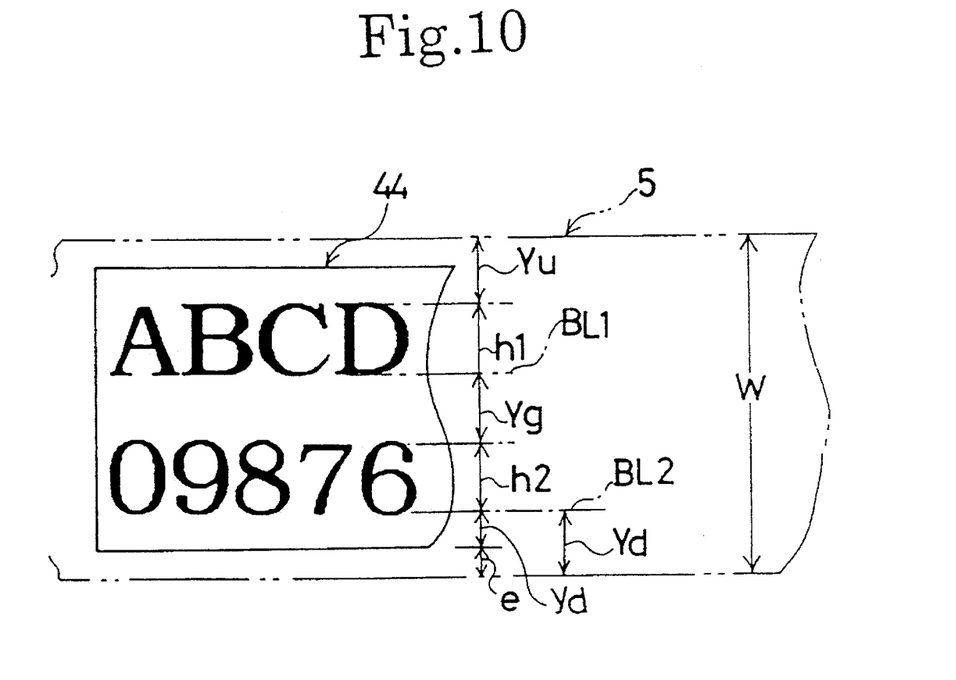
FIG. 10 is another sample illustration of the allocation of the character image spread on the print buffer.

As shown in FIG. 10, for example, when print is executed in a dual print line mode, the controller C positions the BL2 corresponding to the second print line above the bottom of the print buffer 44 with a margin of the residual lower blank space width Yd calculated by subtracting the width of the print inhibit area e from the lower blank space width Yd. The controller C also positions the BL1 corresponding to the first print line above the BL2 with a margin given by totaling the character height h2 for the second print line and the blank space width between the print lines Yg. The dot pattern data for the character string "ABCDE" is spread along the base line BL1, and the dot pattern data for the character string "09876" is spread along the base line BL2 respectively. As a result, as shown in FIG. 11, the blank space widths are arranged so that the printed medium represent a well-balanced impression irrespective of the irregularity in character sizes. However, if the tape medium 5 with the tape width W smaller than the width of the print allowance area G is used, the tape width W brings a limitation on the print allowance area G. In this case, the blank space width Y is set to be identical to the Yu, Yd and Yg.

Figure 13:
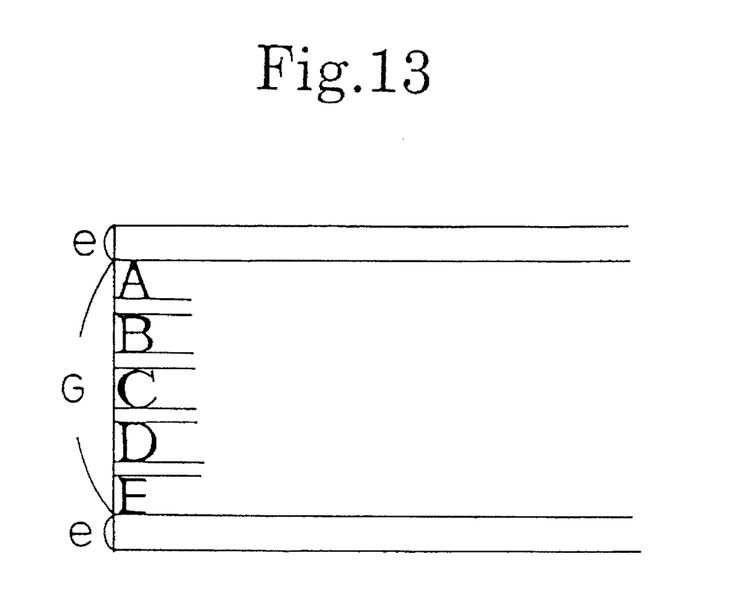
FIG. 13 is a sample illustration of a printed image on the tape medium with the blank spaces between the print lines narrower than the width of the print inhibit area e.

If the blank space width Y is smaller than the width of the print inhibit area e and print execution is found to be impossible (S322:Yes), the base lines BL are re-positioned in the steps S314 through S316, followed by the image combination process for spreading the dot pattern data generated in the above process on the print buffer 44 and subsequent print execution (S400). In this case, the width of the top blank space and the bottom blank space is set at the width of the print inhibit area e, and the difference in the width between the print allowance area and the total character height is evenly distributed to the blank spaces between the print lines as shown in FIG. 13.

Besides the above description, modifications can be made to the present embodiments within the scope of the present invention. For example, various tape medium with a tape width other than 24 mm can be used in the tape printing device. In this modification, an indicator may be provided on the cassette case for informing the tape printing device of the tape width. In this embodiment, a detector provided on the print mechanism PM detects the tape width, and retrieves the character size data by referring to the ROM 32. Another modification can also be made to the present embodiment by altering the data storage operation so that the memory holds the dot pattern data for characters rather than the outline data.

What is claimed is:

1. A printing control system for controlling spacing of a plurality of printed lines of characters by a tape printing device to form a print image on a tape having a width, comprising:

memory means for storing character data including character height, print data including number of lines in the print image and size data including a print allowance area within the width of the tape;

image generation means for generating dot pattern data from character data and size data;

spacing means for determining a blank space width adjacent both upper and lower sides of each printed line of characters based on the stored character data including the character height, the stored print data including the number of lines in the print image and the stored size data; and positioning means for positioning the plurality of printed lines of characters evenly spaced within the print allowance area on the tape according to the blank space width.

2. The printing control system of claim 1, wherein said image generation means modifies character data by one of enlarging and condensing the printed lines of characters to generate dot pattern data by combining character data and size data.

3. The printing control system of claim 1, wherein said spacing means includes distributing means for distributing the blank space widths into an upper blank space width, a lower blank space width and an intermediate blank space width.

4. The printing control system of claim 1, wherein said spacing means includes character height calculating means for calculating total character height based on the number of print lines.

5. The printing control system of claim 4, wherein the size data further includes data relating to a width of tape to be printed on, and said spacing means includes blank space width calculating means for calculating a total blank space width based on the total character height and the width of tape.

6. The printing control system of claim 4, wherein said spacing means includes blank space width calculating means for calculating a total blank space width based on the total character height and the print allowance area.

7. The printing control system of claim 6, wherein said spacing means includes base line allocating means for allocating base lines based on the blank space width, the print allowance area and character height.

8. The printing control system of claim 4, further comprising warning means for warning an operator when said memory means includes no data and said spacing means has determined that the total character height exceeds the print allowance area.

9. The printing control system of claim 1, further comprising indicating means for indicating a width of tape for printing including a tape width detector.

10. The printing control system of claim 1, wherein the size data further includes a print inhibit area having a width.

11. The printing control system of claim 10, wherein when said spacing means determines the blank space width to be less than the print inhibit area width the blank space width is determined to be smaller than the print, said positioning means evenly distributes the plurality of print lines within the print allowance area.

12. A tape printing device comprising:

an input inputting character data, print data and size data;

an editor editing character data and size data;

a printer printing a plurality of lines of characters on a tape having a width; and a printing controller controlling spacing of the printed lines on the tape, including a memory storing character data including character height, print data including a number of lines in the print image and size data including print allowance data within the width of the tape;

an image generator generating a print image from character data and size data;

a spacer determining a blank space width adjacent the printed lines of characters based on the stored character data including the character height, the stored print data including the number of lines in the print image and the stored size data; and a positioner positioning the plurality of printed lines of characters evenly spaced within the print allowance area on the tape according to the blank space width.

13. The tape printing device of claim 12, wherein the print data includes the number of lines in the print image and said spacer includes a character height calculator calculating total character height based on the number of print lines.

14. The tape printing device of claim 13, wherein the size data includes a width of tape and print inhibit area, and said spacing means includes base line allocating means for allocating at least one base line based on the blank space width, the size data, the character data and the number of lines in the print image.

15. The tape printing device of claim 14, wherein said spacing means includes distributing means for distributing the blank space width into an upper blank space width, a lower blank space width and an intermediate blank space width based on the base lines.

16. A tape printing device comprising:

printing means for printing a plurality of lines of characters on a tape having a width;

memory means for storing a number of lines to be printed, a total character size to be printed, and a printing area width on the tape where the characters are to be printed;

space setting means for setting a space width on the tape, the space width based on the number of lines to be printed and the printing area width minus the total character size; and positioning means for positioning the plurality of lines of characters on the tape with the set space width on both sides of each of the lines of characters so that the lines are evenly spaced within the printing area width on the tape.

17. The tape printing device of claim 16, wherein said space setting means sets the space width by equally dividing an area equal to the printing area minus the total character size by the number of lines of characters plus one.

18. The tape printing device of claim 17, wherein the printing area width is one of a total width of the tape and a print allowance area within the total width of the tape where the characters are capable of being printed.

19. A printing control system for controlling spacing of a plurality of printed lines of characters by a tape printing device to form a print image on a tape having a width defined between an upper tape edge and a lower tape edge, comprising:

memory means for storing character data including character height, print data including number of lines in the print image and size data including print allowance area within the width of the tape;

image generation means for generating dot pattern data from character data and size data;

spacing means for determining a blank space width between each printed line of characters based on the stored character data including the character height, the stored print data including the number of lines in the print image and the stored size data; and positioning means for positioning the plurality of printed lines of characters so that the plurality of printed lines of characters are evenly spaced with respect to each other within the print allowance area on the tape according to the blank space width and so that an upper space width between the upper tape edge and an uppermost line of the plurality of lines is equal to a lower space width between the lowest tape edge and a lowermost line of the plurality of lines.

20. The printing control system of claim 19, wherein the plurality of printed lines of characters include more than two lines and the blank space widths between the printed lines of characters are the same.

21. The printing control system of claim 19, wherein the blank space width is unequal to the upper space width and the lower space width.

* * * * *